United States Patent [19]

Isaka et al.

[11] 4,389,686
[45] Jun. 21, 1983

[54] TRACKING APPARATUS FOR USE IN A VIDEO TAPE RECORDER

[75] Inventors: Takenobu Isaka, Hirakata; Masaaki Kobayashi, Kawanishi, both of Japan

[73] Assignee: Matsushita Electric Industrial Co., Ltd., Osaka, Japan

[21] Appl. No.: 211,713

[22] Filed: Dec. 1, 1980

[30] Foreign Application Priority Data

Dec. 7, 1979 [JP] Japan ................................ 54-159551

[51] Int. Cl.³ .......................................... G11B 21/10
[52] U.S. Cl. ..................................... 360/77; 360/10.2
[58] Field of Search ..................... 360/77, 78, 70, 75, 360/105, 107, 109, 10

[56] References Cited

U.S. PATENT DOCUMENTS 3,585,291  6/1971  Yamakawa ........................... 360/77
4,148,083  4/1979  Watanabe ............................. 360/77
4,237,500  12/1980  Sanderson ........................... 360/77
4,255,768  3/1981  Kubota ................................ 360/77
4,268,875  5/1981  Morio et al. ......................... 360/77
4,285,017  8/1981  Arter et al. .......................... 360/77
4,297,731  10/1981  Melwich et al. ..................... 360/77

Primary Examiner—Alfred H. Eddleman
Attorney, Agent, or Firm—Wenderoth, Lind & Ponack

[57] ABSTRACT

A video tape recorder performs tracking by moving its video heads vertically with respect to the scanning direction of the video tracks through the use of an electric-mechanical transducer. The video tape recorder measures the cycles of the synchronizing signals included in the reproduced video signals, so that the electric-mechanical transducer shifts the video heads to enable regular measuring, thereby allowing the video heads to scan on the regular video tracks.

3 Claims, 26 Drawing Figures

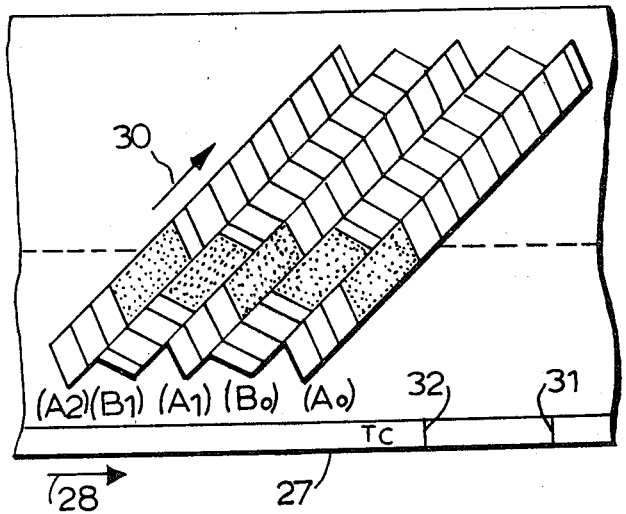
FIG. 2
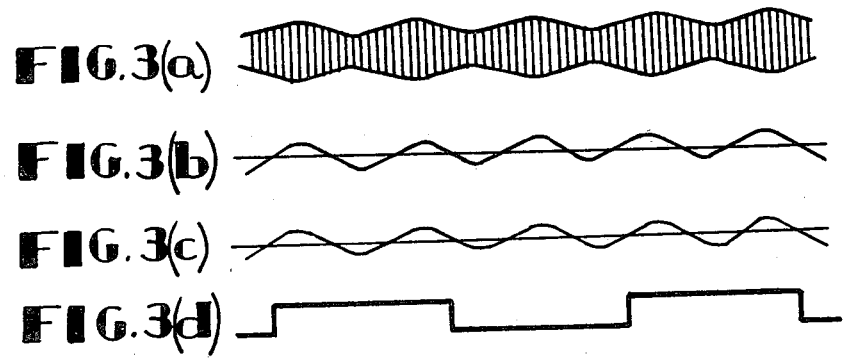
FIG. 3(a)
FIG. 3(b)
FIG. 3(c)
FIG. 3(d)

TRACKING APPARATUS FOR USE IN A VIDEO TAPE RECORDER

FIELD OF THE INVENTION

This invention relates to a video tape recorder for recording and reproducing video signals on a magnetic tape, and more particularly to the position control of a video head when a plurality of video heads are used during production to reproduce the video signals which were previously on the magnetic tape.

BACKGROUND OF THE INVENTION

Conventionally, during reproduction, a plurality of video heads are mounted on an electric-mechanical transducer, to which a dither signal of the drive signal is applied, so that the positions of the video heads with respect to the video tracks are detected from the dither signal and reproduction envelopes of the video heads, thereby constituting a negative feedback loop to enable the video heads to be on-track.

Such a device, when using a plurality of video heads for reproduction, has each video head constituting a negative feedback loop on the basis of its own reproduction envelope. As a result, the problem has been created in that it is impossible to determine if each video head is scanning on a desired track or on an adjacent track to thereby cause the so-called track jumping phenomenon.

BRIEF SUMMARY OF THE INVENTION

An object of the invention is to provide a video signal recording and reproducing apparatus or video signal reproducing apparatus, having a novel tracking apparatus.

Firstly, a tracking apparatus is provided which allows the video heads to accurately scan the recorded tracks on a magnetic tape.

Secondly, a tracking apparatus is provided which moves the mechanical positions of the video heads in an approximately perpendicular direction with respect to the lengthwise direction of each video track through electric-mechanical transducer.

The tracking apparatus of the present invention is directed to the attainment of either normal, slow-motion, or fast-motion reproduction of a high quality by means of such a configuration that, when a plurality of video heads reproduce video signals, every video head scans a desired track on the magnetic tape.

The present invention comprises a tracking apparatus for a video signal reproducing device, the tracking apparatus including: a plurality of video heads for scanning the video tracks; an electric mechanical transducer for moving the video heads perpendicularly to the scanning direction of each video track; a demodulator for demodulating the reproduced signal to obtain a reproduced video signal; a vertical synchronizing signal separation circuit for separating a vertical synchronizing signal from the reproduced video signal; a pulse processing circuit for detecting the rotary phase of each video head; a time-voltage conversion circuit for converting the cycles of the vertical synchronizing signal into a voltage by means of the rotary phase output by the pulse processing circuit; a holding the circuit for holding output voltage of the time-voltage conversion circuit; a level comparison circuit to level-compare the output voltage of the time-voltage conversion circuit with that of the holding circuit; a control voltage generating circuit which compares a set reference voltage with an output of the level comparison circuit, and, when they are not equal, generates a voltage; a tracking control signal generating circuit for controlling the position of a video head to keep it on the desired video track; and an adder to add the output signals of the control voltage generating circuit and tracking control signal generating circuit so that the signal output by the adder is supplied to the electric-mechanical conversion elements to thereby allow the video heads to respectively scan the proper video tracks.

These and other objects of the invention will become more apparent in the detailed description in accordance with the accompanying drawings in which:

BRIEF DESCRIPTION OF THE DRAWINGS

FIG. 2 is a view of an example of record track patterns of a magnetic tape.

FIGS. 3(a)–3(d) each show a signal waveform of points in FIG. 1.

DETAILED DESCRIPTION OF THE INVENTION

Figure 1:
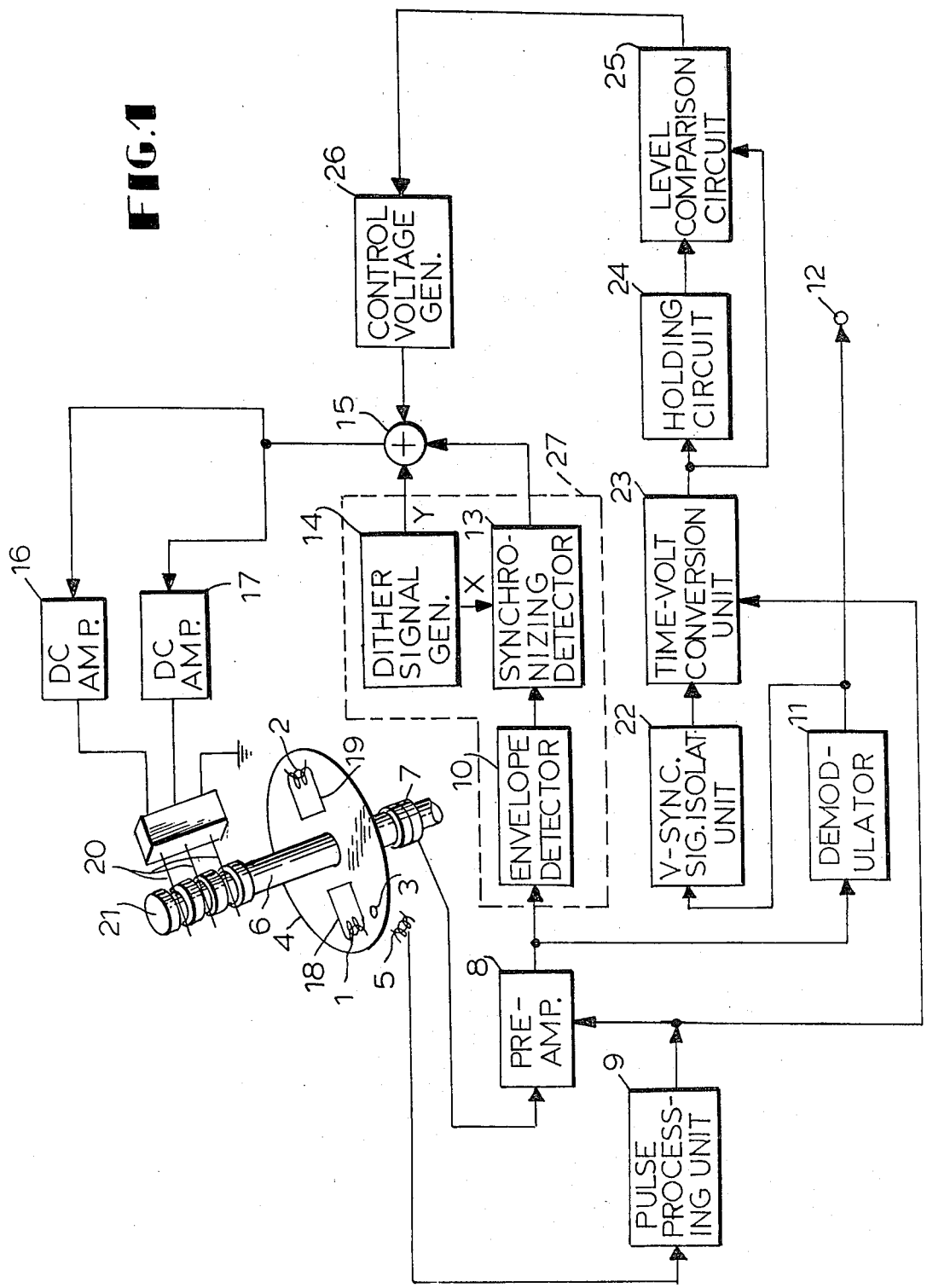
FIG. 1 is a view of the principal portion of a video tape recorder in accordance with an embodiment of the present invention.
Figure 4A:
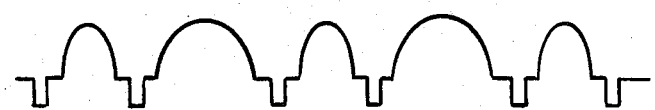
FIGS. 4 -(a), -(b), -(c), -(d), -(e), -(f), -(g), -(h), and -(i) each show a signal waveform of points in FIG. 1.
Figure 4B:
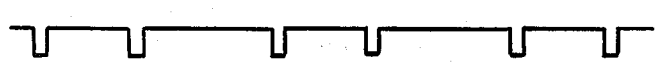
Figure 4C:
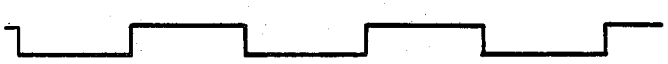
Figure 4D:
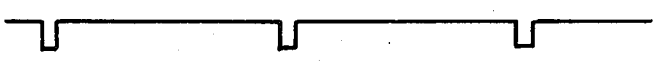
Figure 4E:
Figure 4F:
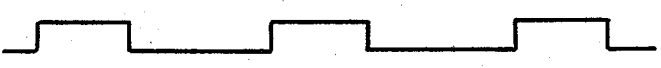
Figure 4G:
Figure 4H:
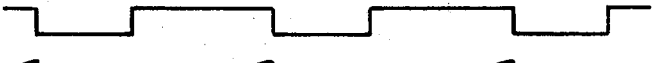
Figure 4I:
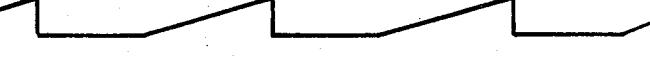

FIG. 1 shows a block diagram of a principal portion of an embodiment of an auto-tracking apparatus of the present invention, in which reference numerals 1 and 2 designate video heads having equal azimuth angles, e.g. 6°; the heads are respectively mounted on free ends of electro-mechanical conversion elements 18 and 19, such as bimorph type piezo-electric elements. The electro-mechanical transducers 18 and 19 have their other ends mounted on a rotary disc 4. Reference numeral 3 designates a magnet, used for detecting the rotary phases of video heads 1 and 2, and 7 mounted on the rotary disc 4. A rotary phase detector 5 is provided at the stationary unit side and opposite to magnet 3. The rotary disc 4 is driven by a d.c. motor (not shown) through a rotary shaft 6 and rotates at high speed with a frequency of about 30 Hz. The phase control of the rotary disc 4 is so well-known that its description has been omitted. A magnetic tape (not shown) is wound onto the rotary disc 4 at a circumferential angle of about 180° and is driven at a constant speed by a capstan and pinch rollers. Such a magnetic tape drive system is well-known and is not shown in the drawing herewith.

The output signals of video heads 1 and 2 are fed to a pre-amplifier 8 at the stationary side. RF signals from video heads 1 and 2 are alternately switched at pre-amplifier 8 by a signal (to be hereinafter called the head switch signal) comprising an output signal of the rotary phase detector 5 which has been processed by a pulse processing unit 9. The output from pre-amplifier 8 is then fed to an envelope detector 10 and demodulator 11.

The envelope detector 10 detects the amplitude distortion of RF signals reproduced by video heads 1 and 2. An output signal of the envelope detector 10 is fed into one input terminal of a synchronizing detector 13. An output signal of a dither signal generator 14 is fed to the other input terminal of the synchronizing detector 13. An output signal of the synchronizing detector 13 is added by an adder 15 to the output signal of the dither signal generator 14 and is fed to DC amplifiers 16 and 17. The added signal is amplified to be voltage which is high enough to drive transducers 18 and 19 and is supplied thereto via conductive brushes 20 and slip rings 21, the slip rings 21 being mounted on rotary shaft 6.

One output signal of demodulator 11 is fed to an output terminal 12 and the other output signal thereof is fed to a time-voltage conversion unit 23 through a vertical synchronizing signal isolation or separator unit 22. An output of the time-voltage conversion unit 23 is fed to a holding circuit 24 and level comparison circuit 25. An output of the holding circuit 24 is fed to the adder 15 via a level comparison circuit 25 and a control voltage generator 26.

Next, a conventional example and an embodiment of the invention will be detailed of their operations.

FIG. 2 is a view exemplary of track patterns recorded on a magnetic tape 28, in which references $A_o$, $B_o$, $A_1$, $B_1$ and $A_2$ designate video tracks where one field of each video signal is recorded as a given unit. $A_o$, $A_1$ and $A_2$ are recorded by video heads (not shown) of an equal azimuth angle ($+6°$ in this embodiment of the invention), and $B_0$ and $B_1$ are recorded by video heads (not shown) of another azimuth angle ($-6°$ in this embodiment).

In addition, oblique lines on each track represent recording positions of horizontal synchronizing signals and dotted portions represent recorded positions of vertical synchronizing signals.

Tc designates a control track on which a control signal showing the recorded position of the video signals is recorded. On the control track, reference numerals 31 and 32 designate control signals recorded once per frame, so that the starting point of track $A_0$ and control signal 31, are recorded at the same time and the starting point of track $A_1$ and control signal 32 are similarly recorded.

At first, the rotary phases of video heads 1 and 2 are detected by the combination of magnet 3 and rotary phase detector 5. The pulse processing unit 9 employs, for example, a monostable multivibrator circuit to generate a head switch signal as shown in FIG. 3 (d); it is assumed that the leading edge of the head switch signal is coincident with the time when the video head 1 starts its scanning of the track, and that the trailing edge of the head switch signal is coincident with the time when the video head 2 starts its scanning of the track. Hence, the reproduced signals generated by video heads 1 and 2 are alternately selected in pre-amplifier 8 by means of the head switch signal from the pulse processing unit 9, and are converted into a continuous signal to be fed to a tracking control signal generator 27 and the demodulator 11. The envelope detector 10 of the tracking control signal generator 27 is fed a reproducing signal as shown in FIG. 3 (a). Envelope detector 10 comprises a usual diode detection circuit, whose output terminal outputs a signal showing the envelope as shown in FIG. 3 (b). Synchronizing detector 13 is fed the envelope signal and output signal at terminal X of the dither signal generator 14 as shown in FIG. 3 (c). As a result, when video head 1 is scanning video track $A_1$, if video head 1 shifts upwardly, the synchronizing detector 13 outputs a negative voltage as the tracking control signal, and conversely, if video head 1 shifts downwardly, detector 13 outputs a positive voltage, and the output of detector 13 becomes zero when the head is on track. Such a tracking control signal is added by adder 15 to the output signal (in phase with the output at terminal X) at terminal Y of the dither signal generator 14, and the adder 15 output is applied to electric-mechanical conversion elements 18 and 19 through d.c. amplifiers 16 and 17, conductive brushes 20 and slip rings 21. Consequently, the scan positions of video hands 1 and 2 are compensated so as to be on track, thereby completing the control loop. In addition, the RF signals shown in FIG. 3 (a) represent upward shifts of video heads 1 and 2 with respect to track $A_1$.

However, RF signals the same as signals which are shown in FIG. 3 (a) are fed to complete the control loop when video head 1 scans track $A_1$ and video head 2 scans track $A_2$, so that both shift upwardly.

As noted above, demodulator 11 feeds a reproduction video signal as shown in FIG. 4 -(a) into vertical synchronizing signal isolation unit unit 22 where the vertical synchronizing signal which is as shown in FIG. 4 -(b) and which is separate from the video signal, is fed into one input terminal of the time-voltage conversion circuit 23; the other input terminal of circuit 23 receives the head switch signal as shown in FIG. 4 -(c), the head switch signal being output from the pulse processing unit 9.

Figure 5:
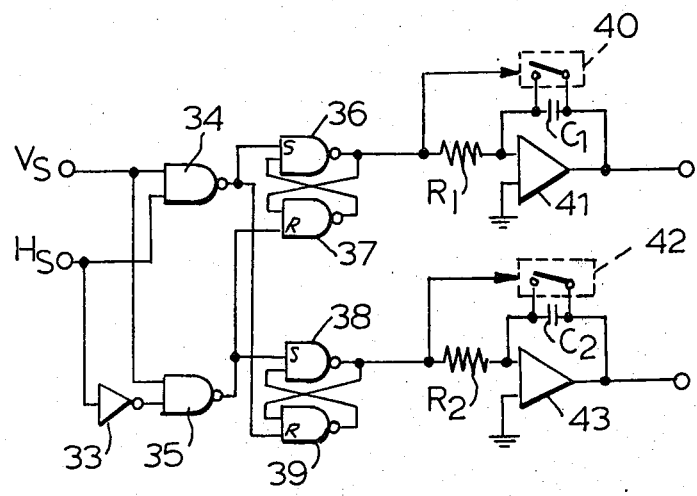
FIG. 5 is a block diagram exemplary of a time-voltage conversion unit used in an embodiment of the present invention.
Figure 6A:
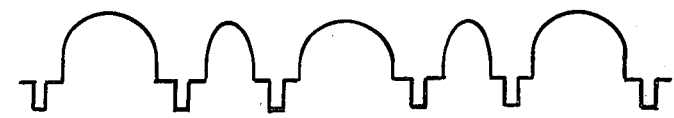
FIGS. 6 -(a), -(b), -(c), and -(d) and FIGS. 7 -(a), -(b), -(c), -(d), -(e), and -(f) are views of other examples of signal waveforms of points in FIG. 1.
Figure 6B:
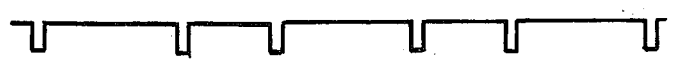
Figure 6C:
Figure 6D:
Figure 7A:
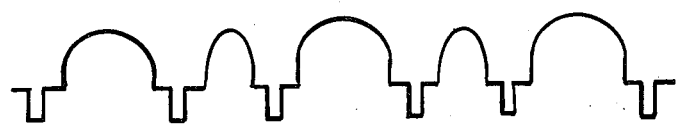
Figure 7B:
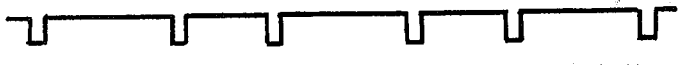
Figure 7C:
Figure 7D:
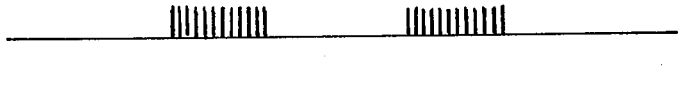
Figure 7E:
Figure 7F:
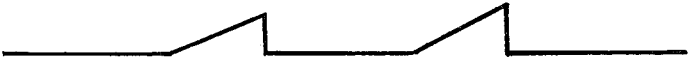

The aforesaid time-voltage conversion circuit 23 is shown in detail in FIG. 5.

In the drawing, an input terminal $V_S$ receives the vertical synchronizing signal shown in FIG. 4 -(b) and input $H_S$ receives the head switch signal shown in FIG. 4 -(c). The vertical synchronizing signal fed into input terminal $V_S$ is fed to input terminals of two input logic NAND gate circuits 34 and 35. The head switch signal in FIG. 4 -(c) which is fed to input terminal $H_S$ is similarly fed into the other input terminal of NAND gate circuit 34 and into the other input terminal of NAND gate circuit 35 via an inverter 33.

Hence, vertical synchronizing signals as shown in FIGS. 4 -(d) and -(e) are respectively obtained at the outputs of NAND gate circuits 34 and 35. These signals are fed to set input terminals S and reset input terminal of a pair of R RS flip-flop circuits composed of NAND gate circuits 36, 37, 38 and 39. At the outputs of the flip-flop circuits are obtained signals, as shown in FIGS. 4 -(f) and (h), of synchronizing signals alternately set or reset as shown in FIGS. 4 -(d) and -(e). In addition, signals shown in FIGS. 4 -(f) and -(h) represent, for example, a time period of the H level corresponding to one field time period of the video signal.

Next, in an integrating circuit comprising resistances $R_1$ and $R_2$, capacitors $C_1$ and $C_2$, operational amplifiers 41 and 43, and switches 40 and 42; the respective capacitors $C_1$ and $C_2$ are charged for the time period during the H level of the signals shown in FIGS. 4 -(f) and -(h), thereby obtaining the signal voltages as shown in FIGS. 4 -(g) and -(i). Hence, the measurement of the crest values of the waveforms of voltage shown in FIGS. 4 -(g) and -(i) corresponds to the measurement of the reproduced video signal for every field. In addition, a difference is found between the crest values of the voltage waveforms shown in FIGS. 4 -(g) and -(i), which is for the reason that the embodiment of the present invention, as shown in FIG. 2, reproduces magnetic tape 28 recorded at one azimuth angle, by the use of video heads 1 and 2 of the same azimuth angles, so that, when magnetic tape 28 is assumed to travel at a reproducing speed equal to that used for recording, continuous RF signals such as shown in FIG. 3 (a) are obtained in such a manner that, for example, assuming that video head 1 scans video track $A_1$ at the first field, then video head 2 tends to scan the starting point of video track $B_1$ at the second field; but, the aforesaid control loop allows video head 2 to shift about perpendicularly with respect to the video track by one pitch of the video track, whereby video head 2 scans video track $A_1$, which is because the vertical synchronizing signal cycles differ due to different scanning times between the starting point of the video track scanning and the vertical synchronizing signal. In this instance, the vertical synchronizing signal cycles, when the video tracks are recorded in a range of 1.5H (1H= one cycle of the horizontal synchronizing signal), become 261H and 264H. As a result, the voltage waveforms shown in FIGS. 4-(g) and -(i) are similarly different from each other.

Next, the crest value of the voltage waveform in FIG. 4-(g) is held for the next field period by the holding circuit 24 and compared with the crest value at the next field, i.e., the voltage waveforms in FIG. 4-(i), by use of a level comparison circuit 25. The level comparison circuit 25 subtracts the voltage waveforms in FIGS. 4-(g) and (i) so as to output a voltage corresponding to 261H−264H=−3H. A control voltage generating circuit 26, when the output signal of level comparison circuit 25 is equal to a reference voltage corresponding to the aforesaid −3H, adds a zero voltage to adder 15 assuming that no track jumping occurs.

However, when the video head scans track $A_2$, in other words, when the track jumping occurs as noted above the video signal shown in FIG. 6-(a) is reproduced. Furthermore, a separated vertical synchronizing signal as shown in FIG. 6-(b) is reproduced. Voltage waveforms as shown in FIG. 6-(c) and -(d) are derived from time-voltage conversion circuit 23. The level comparison circuit 25, which is driven similarly to the previously noted case by the vertical synchronizing signal in FIG. 6-(b) which has been separated from the video signal shown in FIG. 6-(a), outputs a voltage corresponding to 264H−261H=3H. The control voltage generating circuit 26 is constructed so as to determine the occurence of no track-jumping when the level comparison voltage of the first and second fields is equal to a reference voltage corresponding to −3H. Hence, since the level comparison circuit 25, outputs a voltage corresponding to +3H, the control voltage generating circuit 26 feeds to adder 15 the voltage which is necessary to move video head 2 downwardly for two pitches of video track.

Accordingly, the invention is very advantageous in that video heads 1 and 2 can be kept in on-track condition by means of the control loop while compensating for the track jumping.

In addition, in the embodiment of the present invention, the magnetic tape speed during reproduction is equal to that during recording, but the track jumping, of course, can be determined at a different speed by the same configuration.

In the embodiment of the present invention, the video heads a of single azimuth angle (+6° in the embodiment) reproduce the video tracks comprising video tracks recorded by the video head of an azimuth angle of +6° and those recorded by the video head of an azimuth angle of −6°, which are arranged alternately with respect to each other. Alternatively, a combination of a video head of an azimuth angle of +6° with a video head of that of −6° may detect the track jumping through the same configuration for reproduction. Alternatively, for example, when the voltage waveforms which are shown in FIGS. 7-(e) and -(f) and which correspond to the number of horizontal synchronizing signals shown in FIGS. 7-(c) and which are -(d) and reproduced for a time period of the H level of the signal waveforms as shown in FIG. 4-(f) and (h) are compared by level comparison circuit 25, the same effect is obtainable in the embodiment of present invention because the above comparison corresponds to the measurement of the vertical synchronizing signal cycles. In addition, the waveforms shown in FIGS. 7-(a) and -(b) correspond to the waveforms shown in FIG. 6-(a) and -(b).

The foregoing disclosure is for the purpose of disclosing a specific preferred embodiment and the scope of this invention is of course not to be limited to this specific construction but as defined in the following claims.

What is claimed is:

1. A video signal reproducing device for reproducing video signals from a magnetic tape on which signals of unit lengths are recorded as video tracks inclined at a pescribed angle with respect to the lengthwise direction of said magnetic tape, said device being provided with: a tracking apparatus having video heads for scanning said video tracks so as to obtain reproduced signals, an electric-mechanical transducer for moving said video heads in a direction which is perpendicular to the scanning direction of said video tracks, a demodulator for demodulating said reproduced signals so as to obtain reproduced video signals, a vertical synchronizing separator circuit for separating vertical synchronizing signals from said reproduced video signals, a pulse processing circuit for detecting rotary phases of said video heads, a time-voltage conversion circuit for converting cycles of said vertical synchronizing signals into a voltage by means of signals corresponding to said rotary phases of said video heads which are derived from said pulse processing circuit, a holding circuit for holding an output voltage of said time-voltage conversion circuit and said holding circuit, a control voltage generating circuit which compares a set reference voltage with an output of said level comparison circuit and which generates a voltage when said reference voltage and said output voltage are not equal to each other, a tracking control signal generating circuit for controlling said video head positions so as to track said video tracks, and an adder which adds an output signal from said control voltage generating circuit with an output signal from said tracking control signal generating circuit, so that signals derived from said adder are fed to said electric-mechanical transducer, thereby allowing said video heads to scan said video tracks.

2. A tracking apparatus according to claim 1, wherein said tracking control signal generating circuit comprises an envelope detector which detects envelope components in reproduced signals reproduced by said video heads, a dither signal generator for generating a dither signal which is supplied to said electric-mechanical transducer in order to vibrate said video heads, and a synchronizing detector which synchronously detects an output signal of said envelope detector with respect to said dither signal, using signals of a sum of said dither signal and said output of said synchronizing detector.

3. A tracking apparatus according to claim 1, wherein said time-voltage conversion circuit converts the number of horizontal synchronizing signals occurring between said vertical synchronizing signals into a voltage.

* * * * *